Nov. 1, 1960     J. R. WALL ET AL     2,958,516
APPARATUS FOR MAKING SYNTHETIC RESINS
Filed March 15, 1957     3 Sheets-Sheet 1
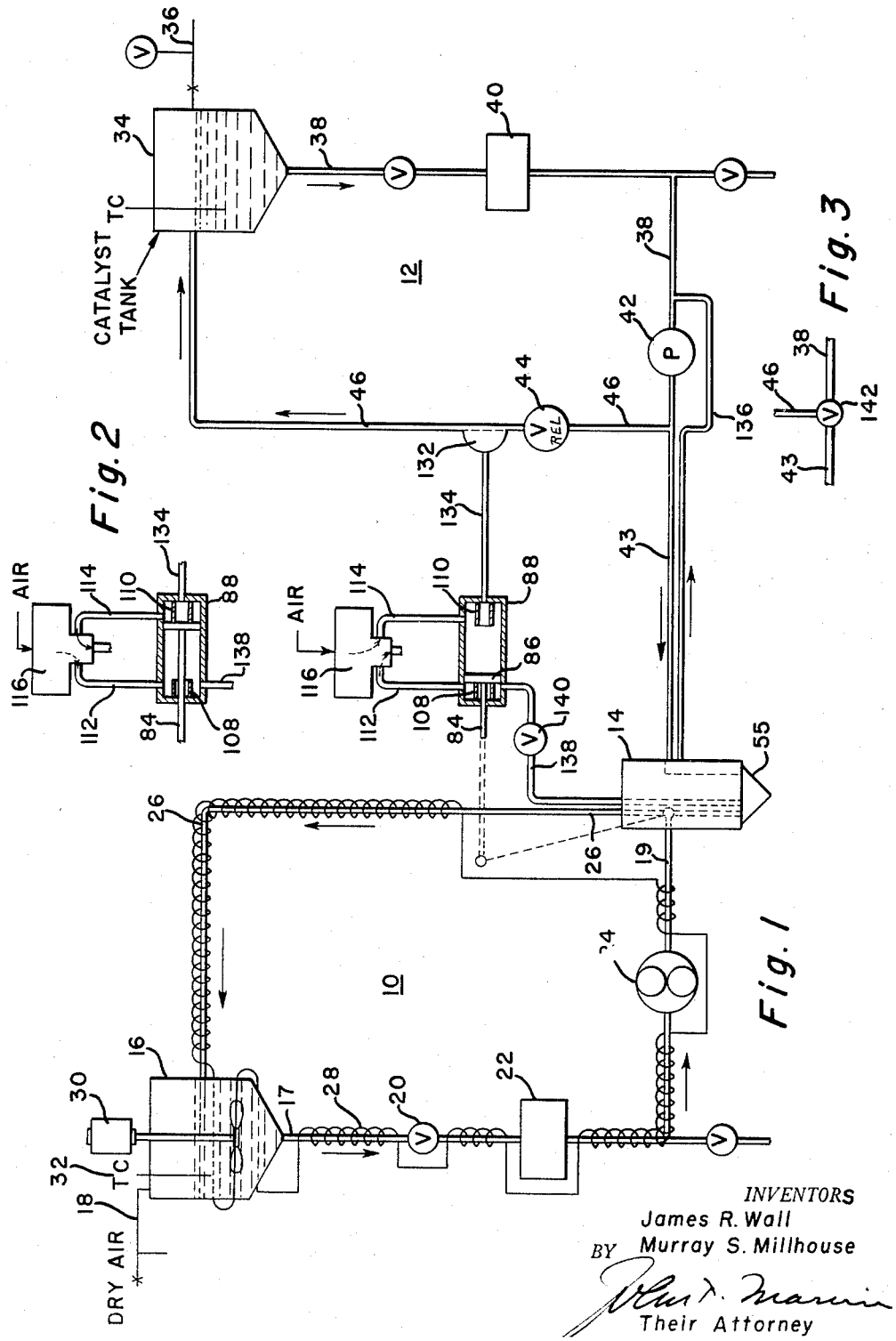
INVENTORS
James R. Wall
Murray S. Millhouse
BY
Their Attorney Nov. 1, 1960 J. R. WALL ET AL 2,958,516
APPARATUS FOR MAKING SYNTHETIC RESINS
Filed March 15, 1957 3 Sheets-Sheet 2

INVENTORS
James R. Wall
Murray S. Millhouse
BY
Their Attorney

Nov. 1, 1960   J. R. WALL ET AL   2,958,516
APPARATUS FOR MAKING SYNTHETIC RESINS
Filed March 15, 1957   3 Sheets-Sheet 3
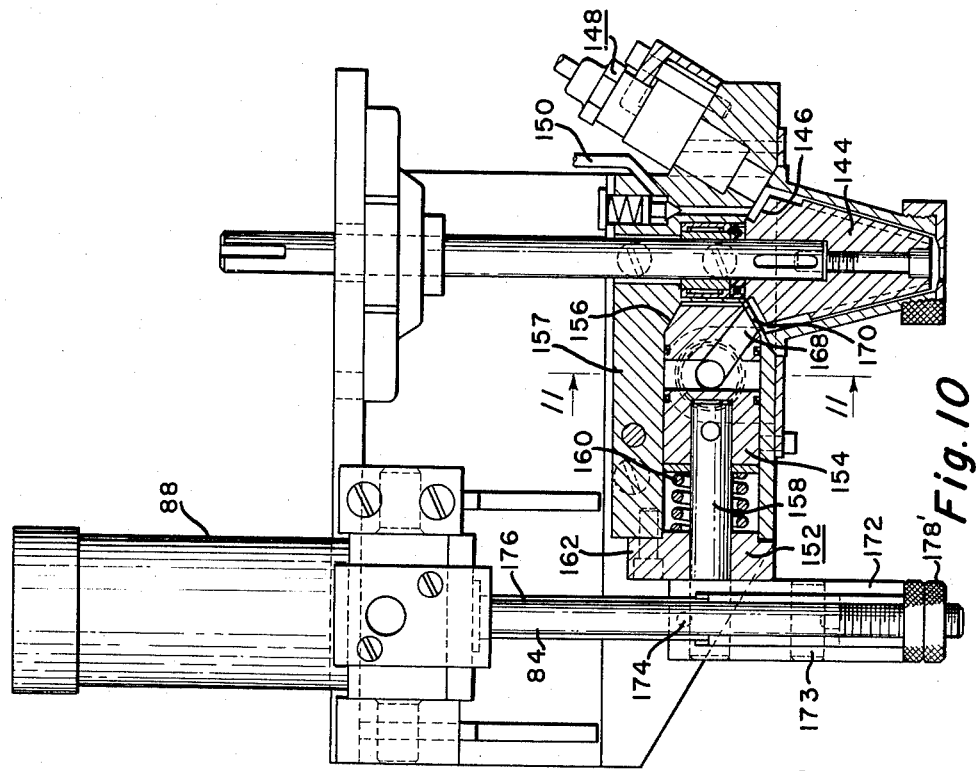
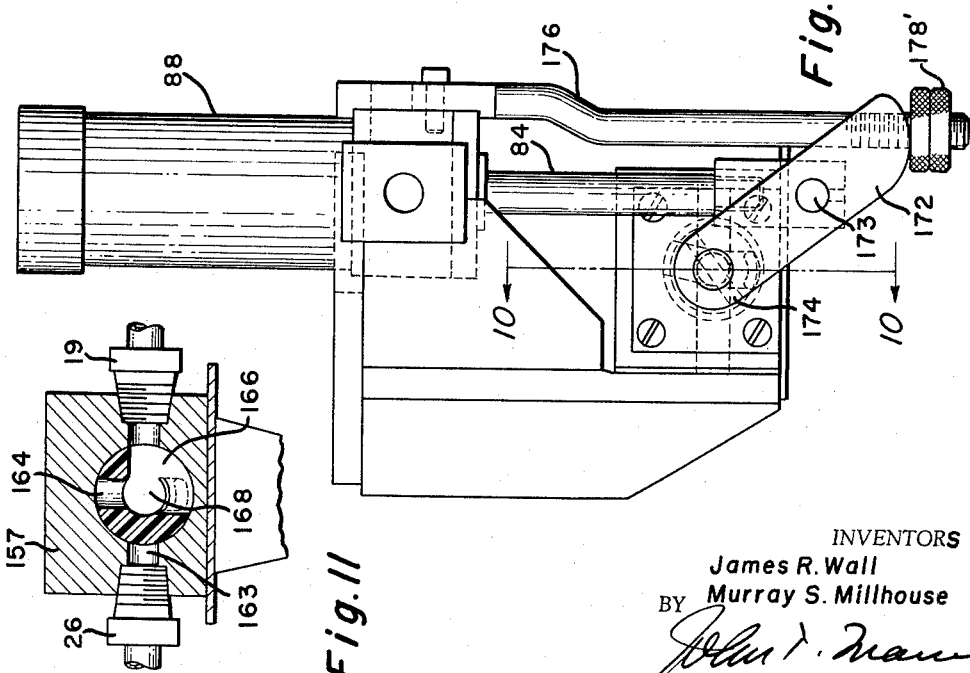
INVENTORS
James R. Wall
BY Murray S. Millhouse
Their Attorney United States Patent Office 2,958,516
Patented Nov. 1, 1960

2,958,516

APPARATUS FOR MAKING SYNTHETIC RESINS

James R. Wall and Murray S. Millhouse, Dayton, Ohio, assignors to General Motors Corporation, Detroit, Mich., a corporation of Delaware Filed Mar. 15, 1957, Ser. No. 646,471

2 Claims. (Cl. 259—8)

This invention relates to an improvement in an apparatus for the manufacture of polyurethane plastics.

It is well known that a wide variety of plastic materials of a rigid, semi-rigid or elastic consistency generally known as polyurethane plastics, may be made by an essentially polyaddition reaction of a wide variety of organic materials containing free hydrogen reactive groups and organic polyisocyanate compounds. In the manufacture of suitable products, various cross-linking materials, catalytic agents, reaction controlling ingredients, plasticizers, fillers, and other materials effecting the physical and chemical properties of the products may be added to the reaction mixture.

Among the organic materials having free reactive hydrogen groups which may be utilized are polyesters, polyesteramides, alkylene glycols, polyisocyanate-modified alkylene glycols, polyoxyalkylene glycols, polyisocyanate-modified polyoxyalkylene glycols, castor oil etc. These and other materials are described in the U.S. patents such as 2,772,945, 2,764,565 and 2,284,896.

Suitable organic polyisocyanates which may be utilized in the production of polyurethane products are 2,4-toluene-diisocyanate and 2,6-toluene-diisocyanate, mixtures of these compounds as well as other organic polyisocyanates referred to in the above mentioned patents.

A reaction mixture may include a polyisocyanate and one or more of the above mentioned reactive hydrogen groups containing organic materials as for example a good commercial grade of castor oil and polyethylene glycol in suitable proportions wherein the latter serves a cross-linking or a chain-extending function, or a copolymer of polypropylene glycol and polyethylene glycol together with suitable proportions of trimethylol propane, wherein the latter serves a cross-linking function. The mixtures may include various catalytic ingredients such as diethanolamine and 1,4-ethanol-2-methyl-piperazine, foam producing additives such as water, plasticizers such as dioctysebacate and various fillers adapted to provide the resulting products with suitable chemical and physical properties.

The production of a particular polyurethane product involves a suitable selection of materials such as is indicated above which are well described in the patent literature and in itself forms no part of the present invention. Regardless of the particular combination of materials utilized, one method of mixing and reacting the materials to produce polyurethane plastics involves feeding a first component into an enclosed mixing chamber including an organic material containing a plurality of hydrogen reactive groups, a second component including an organic polyisocyanate and a third component including a material capable of catalyzing or otherwise influencing the reaction. In this method the three components may be fed in suitably metered quantities into a mixing chamber separately and simultaneously or the second component may be fed into the mixing chamber in physical admixture with either the first or third component.

In a second method the first or reactive hydrogen group containing material is first fully reacted with the polyisocyanate component to form a prepolymer containing substantially no free hydrogen reactive group and an excess of free —NCO groups. The prepolymer is then fed into a mixing chamber separately and simultaneously with a catalyst component including water. In the reaction, the water of the catalyst component first reacts with some of the —NCO groups, converting these groups into amine groups with an evolution of carbon dioxide. The amine groups in turn react with free —NCO groups in an addition reaction which results in chain extension and cross-linking to produce suitable polyurethane foamed plastics.

The reaction processes referred to above involve a series of relatively complex physical and chemical reactions, and the manufacture of reproducible homogeneous products which are uniform in texture and have uniform chemical and physical properties, require a thorough, intimate and ideally instantaneous mixing of the components even though the viscosity and the relative quantities of the components may vary widely with respect to each other and the reaction may be accompanied by considerable viscosity changes and the evolution of heat and gases such as carbon dioxide.

An object of the present invention is to provide apparatus for efficient, intermittent and instantaneous mixing of components capable of producing polyurethane plastics either continuously or intermittently. These and other objects are accomplished by providing an enclosed mixing chamber which includes a rotor capable of relatively high speed rotation, in the form of an inverted cone having a shaft attached centrally thereof, which is surrounded by a housing or nozzle member substantially enclosing the rotor except for a discharge opening at the base of the rotor and provides a relatively small clearance between the rotor and the housing. The top of the rotor is provided with a plurality of radial slots extending to the periphery of the rotor, which continue down the sides of the rotor in the form of spiral grooves terminating at the base thereof. The apparatus includes means for delivering components of various viscosities to the slots in the top of the rotor at accurately predetermined flow rates and predetermined pressures whereby a relatively viscous polymeric component, capable of forming polyurethane plastic when combined with a catalytic component, is delivered to the top of the rotor at relatively low pressure, which is formed into a relatively thin layer under the influence of centrifugal force provided by the rotating rotor, and the catalyst component is injected into the moving layer at relatively high pressure to effect a substantially instantaneous and thorough mixing of the components. The spiral grooves in addition to effecting additional mixing of the components operate to pump the mixed reactants from the mixing chamber before significant reaction of the components occurs. Further objects of the invention are accomplished by providing means for constantly recirculating the components in conduits at certain predetermined pressures and providing a valve arrangement for diverting the flow of components from the circulating lines to the mixing chamber simultaneously and instantaneously and conversely for instantaneously shutting-off the flow of the components to the mixing chamber to re-effect recirculation of the components, to permit intermittent operation of the apparatus. The apparatus is further provided with means associated with the said valve arrangement for purging the mixing chamber of the mixed components to prevent a clogging of the mixing chamber due to the presence of residual mixed reactants therein when the mixing portion of the apparatus is caused to be inoperative for a substantial period of time.

The apparatus is particularly useful for the purpose of depositing mixed reactants in a liquid, substantially unreacted state at certain time intervals and sequentially into a plurality of molds, as for example a series of molds moving along a conveyor or assembly line. The apparatus provides an instantaneous flow of mixed reactants in a liquid state and an instantaneous interruption of flow whereby an accurately metered quantity of the mixed reactants may be deposited within a mold cavity without a loss of material or a clogging of the apparatus.

Further objects and advantages of the present invention will be apparent from the following description, reference being had to the accompanying drawings wherein preferred embodiments of the invention are clearly shown.

Figure 1 is a diagrammatic view in elevation of apparatus for mixing components capable of reacting to form polyurethane plastics embodying the present invention.

Figure 2 is an air valve which forms a portion of the apparatus shown in Figure 1.

Figure 3 is a three-way valve which may be used in connection with the apparatus of Figure 1.

Figure 9 is an elevation view of another embodiment of the mixing unit shown in Figure 4.

Figure 10 is an elevation view in partial cross section taken along line 10—10 of Figure 9.

Figure 11 is a cross-sectional view taken along line 11—11 of Figure 10.

Figure 5:
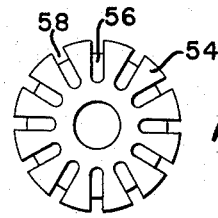
Figure 5 is a top view of a rotor which forms a portion of the mixing unit shown in Figure 4.

The apparatus and process of the present invention will now be described in detail with reference to the drawings. The drawings illustrate a preferred form of the invention and will be described in terms of mixing a prepolymer of polymeric component which is the reaction product of a polymer of polypropylene glycol and polyethylene glycol, trimethylol propane and toluene diisocyanate and which has a viscosity of about 4,000° centipoise at 90° F. and an 8.9% excess of —NCO groups, and a catalyst component comprising 1,4-ethanol-2-methyl-piperazine and water.

*The apparatus in general and the prepolymer feed system*

Referring to the diagrammatical sketch of Figure 1, the apparatus in general consists of a prepolymer component feed portion 10 and a catalyst component feed portion 12 which may feed their respective components to a mixing unit 14 in a predetermined ratio and at a predetermined rate. The prepolymer feed portion 10 includes an enclosed prepolymer storage tank from which the prepolymer passes through outlet conduit 17 under the influence of gravity and compressed dry air from a suitable source 18, through a valve 20, a filter 22 in the form of about a hundred mesh per square inch screen, to a positive displacement or gear pump 24 from whence the prepolymer passes to a valve means 66 of Figure 4 within the mixing unit 14 which hereafter will be described in detail. From the feed valve means within the mixing unit 14, the prepolymer passes into a mixing chamber within the mixing unit 14 to be hereinafter described or is returned to the prepolymer tank 16 by means of the recirculating conduit 26. Since the prepolymer or equivalent component, as in the example, may be relatively viscous under room temperature, the prepolymer tank and recirculating conduit lines are surrounded by electrical heat elements 28 or other suitable heating means. The heating and maintenance of the desired prepolymer temperature is facilitated by a variable speed mixer 30 and thermocouple 32 in an obvious manner. The prepolymer component is subjected to dry air pressure as indicated above to insure that the prepolymer is delivered to the inlet of the gear pump 24 in an adequate amount to insure a constant delivery rate to the mixing unit 14.

*The catalyst feed system*

The catalyst feed portion 12 similarly includes an enclosed storage tank 34 from which the catalyst component passes under the influence of gravity and compressed dry air from a suitable source 36, through the outlet conduit 38, through a filter 40, in the form of about a hundred mesh per square inch screen, to a high pressure pump 42 from whence it passes to an injection nozzle (82 of Figure 4) associated with a mixing unit 14 by means of the conduit 43 or returns to the storage tank 34 through the recirculating line 46 and a high pressure relief valve 44.

*Mixing unit*

Figure 6:
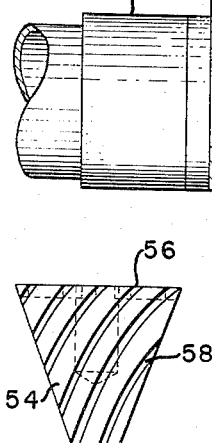
Figure 6 is an elevation view of the rotor shown in Figure 5.
Figure 7:
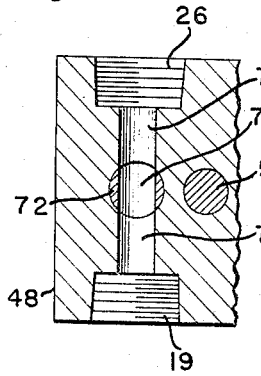
Figure 7 is a cross-sectional view taken along line 7—7 of Figure 4.
Figure 8:
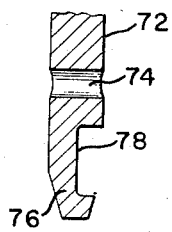
Figure 8 is a vertical section of the valve plug taken along line 8—8 of Figure 4.

One embodiment of the mixing unit 14 is illustrated in Figures 4 through 8 inclusive. It includes a cylindrical housing portion 48 having a central bore 50 in which is rotatably disposed a shaft 52 driven by a variable speed electric motor (not shown). Mounted on the lower end of the shaft 52 is a rotor 54 in the form of an inverted cone having its larger diameter end at the top and enclosed by a complementary inverted cone-shaped nozzle 55 detachably secured to the base 58 of the housing 48. As shown in Figures 5 and 6 the top surface of the rotor 54 is provided with a plurality of radial slots or grooves 56 disposed at spaced radial intervals which continue downwardly along the sides of the rotor in the form of spiral grooves 58 terminating at the base 60 of the rotor. The radial slots 56 and spiral grooves 58 together with a relatively small space or clearance provided between the rotor and the nozzle 55 provide a mixing chamber, the operation of which will be hereafter described. The prepolymer component is admitted to the mixing chamber through an opening 62 (Figure 4) and the catalyst component is admitted to the mixing chamber through an opening 64 in a plane normal to the plane of the top of the rotor 54. The admission of the prepolymer component is controlled by valve means 66 which consists of a longitudinally disposed cylindrical opening 68 terminating in a frusto-conical valve seat portion 70 and the opening 62, which receives a valve plug 72 having an opening 74 transversely thereof, which terminates in a frusto-conical portion 76 seating in the frusto-conical seat 70. A portion 78 of the valve plug 72 including a cylindrical portion and frusto-conical portion is cut away as shown in Figure 8. The prepolymer conduit 19 (Figure 1) leading from the gear pump 24 enters the mixing unit through 19 as shown in Figure 7, passes through a cylindrical opening 77 of the housing 48 and the aligned valve plug opening 74 into the recirculating conduit 26 (Figure 1) when the valve plug 72 is in a closed position, thus permitting the prepolymer to recirculate at a predetermined pressure determined by the speed of the operation of the gear pump 24. It may readily be seen that the valve plug 72 may be raised to move the plug opening 74 out of alignment with the housing opening 77 and the cut-away portion 78 of the valve plug into alignment with the opening 77 of the housing thereby permitting the prepolymer to flow around the frusto-conical portion 76 of the valve plug through the opening 62 into the mixing chamber.

The catalyst component is delivered to the mixing unit by means of conduit 43 from whence it passes to a high pressure relief valve 178 comprising a plunger 79 loaded by a compression coil spring 80 adjustably held by a threaded plug 82. The plunger 79 is provided with a shoulder 84 exposed to catalyst pressure whereby the plunger is raised against the coil spring 80 when the catalyst is raised to a predetermined pressure level whereby the catalyst component is injected into the mixing chamber at a predetermined pressure in a plane normal to the plane of the top of the rotor 54. The pressure at which the plunger 78 will be raised to admit the catalyst component into the mixing chamber may be varied by a variation of the compression of the compression coil spring 80 by means of the thread plug 82. The pressure relief valve 178 may suitably be in the form of a standard American Bosch diesel fuel injector designed to open the release atomized catalyst at a predetermined pressure.

The pressure pump 42 (Figure 1) may suitably be in the form of standard American Bosch diesel fuel injection pump of the constant stroke, lapped, two-plunger type operated by a cam and tappet arrangement and is capable of delivering the catalyst component at a constant rate which may be varied or controlled by the rotation of the lapped plungers, the latter changing the length of their effective strokes, or by a variation of speed of pump operation.

Figure 4:
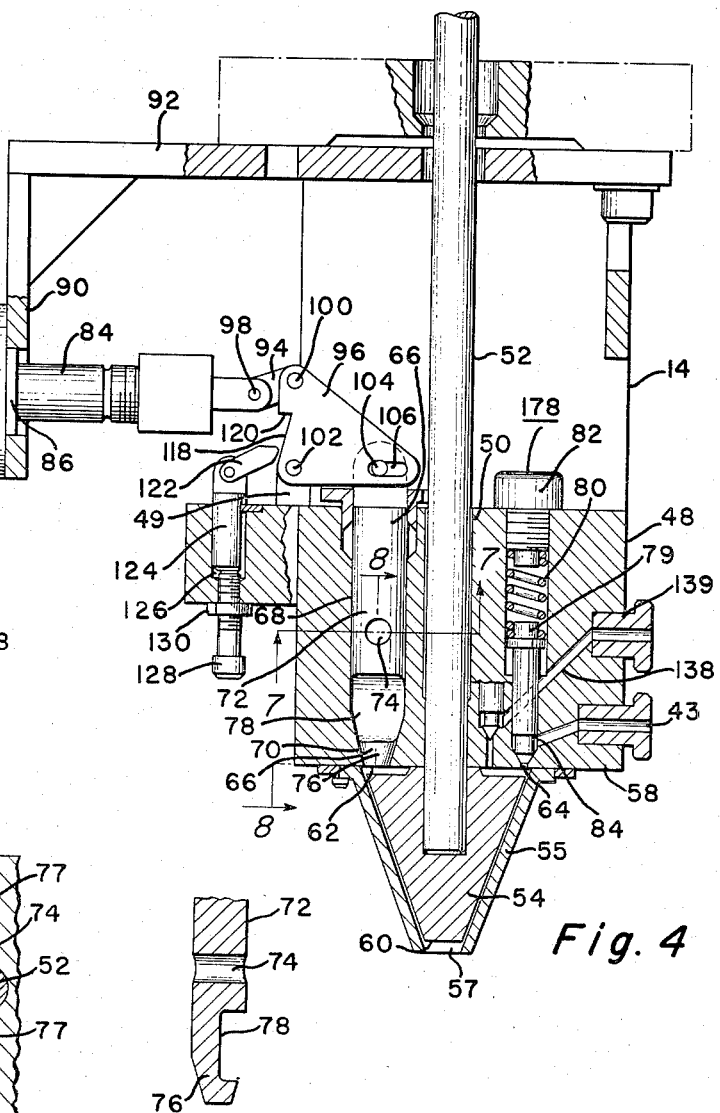
Figure 4 is a vertical elevation cross-sectional view taken through the mixing unit of the apparatus.

The apparatus includes the provision of a valve arrangement whereby the prepolymer and catalyst components may be instantaneously and simultaneously admitted to the mixing chamber and conversely whereby admission of the components may be instantaneously interrupted. The valve plug 72 of Figure 4 is raised to admit the prepolymer component into the mixing chamber and lowered to interrupt the prepolymer flow by means of a reciprocable rod 84 connected to a piston 86 reciprocably disposed in an air cylinder 88. The air cylinder 88 as shown in Figure 4 is preferably supported by a bracket 90 attached to a plate 92 which also supports the housing 48 of the mixing unit. The piston rod 84 is pivotally connected to a link 94 which in turn is pivotally connected to a triangular link or arm 96 by means of pins 98 and 100 respectively. The arm 96 is pivotally connected by means of a pin 102 to a bracket 49 attached to the housing 48. The arm 96 is further pivotally connected to the valve plug 72 by means of a pin 104 attached to the plug 72, disposed within a slot 106 of the arm 96. It may readily be seen that a movement of the connecting rod 84 to the left is operative to move the valve plug 72 upward through the link 94 and arm 96.

The cylinder 88 as shown in Figure 1 has abutments 108 and 110 on each end thereof for limiting the movement of the piston 86. The piston 88 is operated by air pressure, selectively admitted to opposite sides of the cylinder by means of conduit 112 and 114 respectively and a two-way valve 116 shown schematically.

Actuation of the two-way valve 116 to admit air under pressure to the cylinder 88 through conduit 114 is operative to move the piston 86 of the piston rod 84 to the left as shown in Figure 1 or to the right as shown in Figure 4, thereby moving the valve plug 72 to a close or prepolymer recirculating position. Conversely actuation of the valve 116 to admit air under pressure to the cylinder 88 by means of conduit 112 as shown in Figure 2 operative to moving the piston 86 to the right thereby moving the valve plug 72 to an open or prepolymer feed position.

To prevent an undue amount of prepolymer flow due to a surge in the prepolymer feed line on instantaneous raising of the valve plug 72, means is provided to insure that the valve plug 72 is raised only a limited amount to throttle the passage of prepolymer through the opening 62. This means includes a notch provided in the link or arm 96 which includes a sloping wall 118, a shoulder 120, and a pawl 122 pivotally attached to a vertically adjustable support member 124 mounted within a chamber 126. The support member 124 is adjustably held in a desired position by means of a bolt 128 threaded into a nut 130 attached to the housing 148, which are provided with sufficiently fine thread to permit micrometer adjustment of the parts. It may be seen in reference to Figure 4, that as the piston rod 84 is moved to the left, the pawl 122 slides along the wall 118 of the arm 96 until it engages the shoulder 120 to limit the degree to which the valve plug 72 is raised.

Actuation of the air valve 116 to admit air to the cylinder 88 through conduit 114 also admits air to a diaphragm valve 132 through a conduit 134 whereby the catalyst component recirculating line 46 is shut off thus forcing the catalyst component to pass through the catalyst conduit 43 to the injection or relief valve 178 of Figure 4. Conversely when the valve 116 is actuated to admit air to the cylinder 88 by means of conduit 112 as shown in Figure 2, the diaphragm valve 132 is opened due to a lack of air pressure therein with the result that the catalyst component is caused to recirculate if the relief valve 44 is said to relieve at a lower pressure than that of the injection valve 178 (Figure 4). Where the injection valve 178 is in the form of a standard American Bosch fuel injection nozzle, it is desirable to provide a bleed-off line 136 back to the low pressure side of the pump 42.

*Operation*

In the process of mixing the components utilizing the above apparatus the prepolymer component is fed into the mixing chamber through the opening 62 (Figure 4) at a relatively low pressure as for example 50 p.s.i. gauge and the catalyst component is fed into the mixing chamber at a relatively high pressure as for example 250 to 2,000 p.s.i. gauge. The high pressure catalyst component may conveniently be injected intermittently by the relief valve type injector 178 or one or more standard American Bosch diesel fuel injectors.

To place the apparatus into operation the air valve 116 (Figure 1) is actuated to cause the piston to move to the right as shown in Figure 2 whereby the valve plug 72 of Figure 4 is in a closed position and the diaphragm valve 132 is in an open position. The prepolymer tank 16 and catalyst component tank 34 which contain their respective components are subjected to dry air pressure of about 30 p.s.i. gauge. Thereafter the heating coils are energized and the gear pump 24 is put into operation whereby the prepolymer component is caused to flow through conduit 17, filter 22, pumped by the gear pump 24 to exhaust as for example 50 p.s.i., through the valve 66 of Figure 4 and back to the tank 16 by means of the recirculating conduit 26 until the prepolymer has attained a desired temperature and viscosity. In the catalyst component feed system, the valve 44 is set to relieve the pressure just under the operating pressure of the injection valve 178 of Figure 4, thus for example if the valve 178 operates at a pressure of 1500 p.s.i. gauge the valve may be said to operate at a gauge of about 1490 p.s.i. gauge. Accordingly when the catalyst component pump 42 is set into operation, the component passes through the valve 44 and returns to the tank 34 by means of the recirculating conduit 46. The rotor 54 is then caused to rotate at a relatively high speed in a range of 1500 to 3000 r.p.m. and the apparatus is ready for either a continuous or intermittent mixing operation. To cause instantaneous mixing, it is only necessary to actuate the valve 116 to cause the piston 86 to move to the left as shown in Figure 1. This causes the valve plug 72 to be raised and the diaphragm valve 132 to be closed as previously described. Since the prepolymer component is recirculated through the valve 66 at the predetermined pressure of 50 p.s.i. and the catalyst component is recirculating at a predetermined pressure of substantially 1490 p.s.i. the components are instantaneously fed into the mixing chamber. It is to be understood that the above mentioned valves and pressures are calculated to feed the respective components in a proper ratio in accordance with the formulations of the components used. It will be noted that recirculating the components at substantially operating pressures permits proper mixing virtually instantaneously. When it is desired to cease mixing operation for a short time, it is only necessary to actuate the air valve 116 to move the piston 86 to the left to interrupt mixing.

In the mixing operation the prepolymer component is fed into the slots 56 of the rotating rotor 54. In a specific embodiment the rotor is caused to operate at 2700 r.p.m. and the rotor is provided with 12 slots. Accordingly about 540 slots pass under the prepolymer feed opening 62 whereby under the influence of the rotating rotor and centrifugal force, a relatively thin layer of the prepolymer is formed at the top of the rotor, moving outwardly at a high velocity. Simultaneously the catalyst component, in substantially atomized form, is injected at a high velocity into the rapidly moving prepolymer layer. Thus utilizing a two-cylinder standard American Bosch pump as the pump 42, each piston reciprocating at about 1200 cycles per minute, about 40 injections per second are caused through the opening 64. Suitable mixing is effected utilizing injection rates as low as 20 injections per second. The catalyst component impregnated prepolymer is thrown outwardly toward the peripheral extremities of the rotor and is then pumped downwardly and further mixed by means of the helical grooves 58 and pumped out of the nozzle 55 through the opening 57 at the base thereof. The clearance between the top of the rotor and the base of the housing 48 is in the range of .015"–.045" and the clearance between the conical surface of the rotor and the nozzle 55 is in the range of .015"–.045" whereby a mixing chamber is formed wherein a rapid movement of the components and efficient mixing is effected.

*Example 1.*—A prepolymer was prepared by mixing 100 parts by weight of castor oil having a hydroxal number of 160 and an acid number of 1.75, with 14.3 parts by polyethylene glycol, 33.4 parts dioctyl sebacate and 73.4 parts of toluene diisocyanate consisting of 80% 2,4-toluene-diisocyanate and 20% 2,6-toluene-diisocyanate. The materials were mixed at about 85° F. and allowed to exotherm and cook for 1 hour at 230° F. resulting in a prepolymer having approximately 7% free —NCO groups and no free hydrogen reactive groups. A catalyst component was prepared by mixing by weight 42.1% diethanolamine, 24.0% hydrochloric acid (37%) and 33.9% water. The components were mixed as above described in a ratio of 100 parts of the prepolymer to 4.1 parts of the catalyst component to produce a readily flowable, substantially unreacted liquid which when poured into a mold, set up in about ten minutes into a semi-rigid foam having a highly uniform appearance and physical and chemical properties.

*Example 2.*—A prepolymer was prepared by mixing and cooking 100 parts by weight of a copolymer of polypropylene glycol and polyethylene glycol, 3 parts trimethylol propane and 47 parts of a mixture consisting of 80% 2,4-toluene-diisocyanate and 20% 2,6-toluene-diisocyanate to produce a polymer having a viscosity of about 4000 centipoises at 90° F., and 8.9% excess of free —NCO groups and no free hydrogen reactive groups. A catalyst component was prepared by mixing a solution of 37% 1,4-ethanol-2-methyl-piperazine and 63% water. The components were mixed as above described in a ratio of about 100 parts of the prepolymer component to about 5 parts of the catalyst component to produce a readily flowable, substantially unreacted liquid which when poured into a mold set up in a few minutes into a semi-rigid foam having a highly uniform appearance and uniform chemical and physical properties.

*Example 3.*—In the prepolymer composition of Example 1 the plasticizer, dioctyl sebacate was reduced to 5 parts which when mixed as above described produces a readily flowable substantially unreacted mixture which is set up in about ten minutes into a rigid foam mass having a uniform and homogeneous appearance and exhibiting uniform physical and chemical properties.

The apparatus of the present invention is particularly useful for mixing foamable components in a mass production operation where for example a plurality of separate molds supported by a conveyor means are moving continuously under the mixing unit and it is desirable to instantaneously cease the mixing of foamable material as soon as a sufficient quantity of foamable material is poured into a given mold, to avoid pouring an excess of material into a mold and the loss of material which may be deposited between the moving molds. To further provide for an efficient operation of the apparatus, means is provided to clear the mixing chamber of residual mixed reactants whenever the mixing is interrupted. This is particularly essential whenever mixing is interrupted for a substantial period of time to avoid a reaction of the materials within the mixing chamber and a consequent clogging of the apparatus. To this end, as shown in Figures 1 and 4, a compressed air conduit 138 is provided between the air cylinder 88 and the mixing chamber. The conduit 138 inlet is positioned at a point to the left of the piston 86 as shown in Figure 1 whereby the actuation of the air valve 116 to cause a recirculation of the component and a succession of mixing, will cause compressed air to be let into the mixing chamber to blow out residual mixed reactants. The conduit 138 also has a valve 140 provided to cause the purging means to be inoperative after the purging has been completed or when the mixing is to be interrupted for only short periods at a time. A check valve 139 is shown spaced from the base 48 for purposes of clarity but preferably is provided adjacent to the mixing chamber or the base 48 of the housing to prevent passage of mixed reactants into the conduit 138 and the clogging thereof under reacting.

A modification of the apparatus shown in Figure 1 involves an elimination of a diaphragm valve 132 and conduit 134 and in the provision of a three-way solenoid actuated valve 142 at the jointure of the conduits 38, 43 and 46 as shown in Figure 3. This valve is actuated by means of a mercury switch (not shown) associated with the piston rod 84 whereby the movement of the piston rod to the right as shown in Figure 2 will cause the valve 142 to block the passage 43 and permit a recirculation of the catalyst component through the relief valve 44 and conduit 46, and conversely a movement of the piston rod 84 to the left as shown in Figure 1 will cause the valve 142 to block the passage 46 and permit the passage of the catalyst component into the mixing chamber.

The mixing chamber may also be purged of mixed reactants by passing the prepolymer component through the mixing chamber after flow of the catalyst component has been interrupted. To utilize this method the air conduit valve 140 may be closed and the three-way valve modification of Figure 3 may be utilized and operated independently of the prepolymer valve 66 of Figure 4, by operating the mercury switch manually rather than in response to a movement of the piston rod 84.

A second embodiment of the mixing unit is shown in Figures 9 and 10. It differs from the embodiment shown in Figure 4 in that the rotor 144 is provided with a somewhat frusto-conical top portion 146 having a plurality of radial grooves therein which continue in the form of helical grooves down the sides of the rotor and terminate at the base thereof. This permits the catalyst component injection unit 148 and the prepolymer injection valve unit 152 to be installed in a readily installable angular position and yet inject the components at an angle normal to the top of the rotor. A compressed air, purge conduit 150 is provided as in connection with the embodiment of Figure 4. The prepolymer valve 152 is a three-way valve having a frusto-conical seat portion 156 seated in a corresponding valve seat of the valve housing 157 and is attached to a rotatable shaft member 158 and held in constant sealing engagement with the valve seat by means of a compression spring coil 160 held between the valve plug 154 and a cap 162 secured to the housing 157.

The valve plug 154 has a transverse passage 163 therethrough which as may be seen in relation to Figure 11, includes a cylindrical opening 164 on one side thereof extending to a point centrally of the valve plug and an opening 166 on the other side thereof extending across a quadrant of the plug. Extending from a point centrally of the valve plug and the transverse passage 163 is a passage 168 extending to the frusto-conical valve seat surface 156 alignable with an opening 170 leading to the top of the rotor 144. The plug 154 is positioned so that in one position the transverse opening 163 extends between the prepolymer inlet line 19 of Figure 1 and the prepolymer recirculating line 26 of Figure 1 while the passage 168 is blocked off to permit recirculation of the prepolymer, and in a second position, as shown in Figure 11, the prepolymer recirculating line is blocked off and the passage 168 is aligned with the opening 170 to permit passage of the polymer into the mixing chamber. The shaft 158 is non-rotatably attached to a crank 172 by means of a pin 174, and the crank 172 is, in turn, pivotally attached to the piston rod 84 by means of pin 173. In this embodiment the cylinder 88 is pivotally mounted (mounting not shown) and longitudinal movement of the piston rod 84 is translated into rotary movement of the valve plug 154 to move the plug between the above described prepolymer feed and recirculating positions. To prevent a surge of the prepolymer through the opening 170 on a sudden opening thereof, the degree to which the passage 170 is opened is controlled by the provision of a support 176 attached to the cylinder 88, having a nut 178' threaded to one end thereof which limits the downward movement of the crank 172. The nut 178' is threaded on to the support member 176 by means of fine threads to permit micrometer adjustment thereof.

Although the above apparatus has been described in terms of a two-way component system, it is obvious that it may be readily used to mix three or more components wherein for example a mixture of organic material having free hydrogen reactive groups and a polyisocyanate is introduced into the prepolymer tank and the catalyst component is introduced into the catalyst tank. The apparatus may be readily modified to include separate recirculating lines and valves to permit separate introduction of additional components into the mixing chamber. Further the various pumps may be driven by variable speed motors whereby the rate of production of mixed material may be varied without varying the ratios in which the respective components are mixed.

While the embodiments of the present invention as herein disclosed constitute preferred form, it is to be understood that other forms may be adopted.

What is claimed is as follows:

1. Apparatus for mixing separate liquid components capable of reacting to produce polyurethane plastics, comprising in combination; a rotor having side walls generally in the shape of an inverted truncated cone and having a vertical axis; a shaft fixedly attached to the top of said rotor in alignment with the vertical axis thereof wherein the larger diameter end of the cone is at the top; means for rotating said shaft and rotor at relatively high speeds, said rotor having a plurality of radial slots in the top surface thereof and extending to the outer periphery thereof, said rotor having a plurality of helical grooves in the conical walls thereof connecting with and extending from the peripheral ends of each of said slots to the base of the rotor, a generally conical, smooth-surfaced casing closely surrounding said rotor and providing a predetermined uniform clearance around said rotor and having a discharge orifice at its lower end, a first means for admitting at least one component to said slots at an angle normal to the plane of said slots and at a relatively low pressure, and a second means for admitting another component to the slots of said rotor at an angle normal to the plane thereof and at a relatively higher pressure whereby said components are mixed by said rotor and are discharged from said orifice.

2. Apparatus for mixing separate liquid components capable of reacting to produce polyurethane plastics, comprising in combination; a rotor having a vertical axis of rotation and side walls generally in the shape of an inverted truncated cone, a shaft fixedly attached to the top of said rotor in alignment with the vertical axis thereof wherein the larger diameter end of the cone is at the top, means for rotating said shaft and rotor at relatively high speeds, said rotor having a plurality of radial slots in the top thereof extending to the periphery thereof, said rotor having a plurality of helical grooves in the conical walls thereof extending from and connecting with the peripheral ends of each of said slots to the base of the rotor, a casing closely surrounding said rotor and providing a predetermined clearance at the top of said rotor to form a controlled mixing chamber, valve means for simultaneously admitting one component to said chamber at an angle normal to the top of said rotor at a relatively low pressure and another component to said chamber at an angle normal to the top of said rotor at a pressure in excess of the pressure of said one component, said valve means including a means for interrupting the admission of the said components to said mixing chamber, and means for purging said mixing chamber and said rotor of mixed component when the flow of said high pressure component is interrupted.

References Cited in the file of this patent

UNITED STATES PATENTS

| | | |
|---|---|---|
| 1,230,395 | Fornander | June 19, 1917 |
| 2,015,056 | Barnes | Sept. 24, 1935 |
| 2,159,670 | Neitzke | May 23, 1939 |
| 2,559,518 | Smith | July 3, 1951 |
| 2,577,281 | Simon et al. | Dec. 4, 1951 |
| 2,578,393 | Bevarly | Dec. 11, 1951 |
| 2,608,392 | Bowman | Aug. 26, 1952 |
| 2,764,565 | Hoppe et al. | Sept. 25, 1956 |
| 2,847,196 | Franklin | Aug. 12, 1958 |